US 8,458,756 B2

(12) United States Patent
Rodriguez et al.

(10) Patent No.: US 8,458,756 B2
(45) Date of Patent: Jun. 4, 2013

(54) VIDEOPHONE OVER CABLE NETWORKS

(76) Inventors: Arturo A. Rodriguez, Norcross, GA (US); Timothy W. Simerly, Cumming, GA (US); Luis A. Rovira, Atlanta, GA (US); William E. Wall, Jr., Atlanta, GA (US); Neilesh R. Patel, Boston, MA (US)

(*) Notice: Subject to any disclaimer, the term of this patent is extended or adjusted under 35 U.S.C. 154(b) by 927 days.

(21) Appl. No.: 11/567,890

(22) Filed: Dec. 7, 2006

(65) Prior Publication Data

US 2007/0126856 A1    Jun. 7, 2007

Related U.S. Application Data

(63) Continuation of application No. 09/481,155, filed on Jan. 12, 2000, now abandoned, which is a continuation of application No. 08/857,595, filed on May 16, 1997, now abandoned.

(51) Int. Cl.
*H04N 7/173* (2006.01)

(52) U.S. Cl.
USPC .......................... 725/106; 725/109; 370/265

(58) Field of Classification Search
USPC .............................. 725/87–120; 370/265–268
See application file for complete search history.

(56) References Cited

U.S. PATENT DOCUMENTS

| | | | |
|---|---|---|---|
| 5,191,601 A | 3/1993 | Ida et al. | 379/53 |
| 5,343,240 A | 8/1994 | Yu | 348/14 |
| 5,347,305 A | 9/1994 | Bush et al. | 348/14 |
| 5,396,269 A | 3/1995 | Gotoh et al. | 348/14 |
| 5,534,914 A | 7/1996 | Flohr et al. | 348/15 |
| 5,600,364 A * | 2/1997 | Hendricks et al. | 725/9 |
| 5,642,155 A | 6/1997 | Cheng | 725/119 |
| 5,684,799 A | 11/1997 | Bingham et al. | 370/397 |
| 5,708,853 A * | 1/1998 | Sanemitsu | 710/73 |
| 5,724,092 A | 3/1998 | Davidsohn et al. | 348/14.01 |
| 5,745,837 A | 4/1998 | Fuhrmann | 455/51 |

(Continued)

OTHER PUBLICATIONS

U.S. Official Action mailed Jul. 8, 2004 in U.S. Appl. No. 09/481,155.

(Continued)

*Primary Examiner* — Annan Shang
(74) *Attorney, Agent, or Firm* — Merchant & Gould

(57) ABSTRACT

The present invention is directed to a videophone system implemented over a cable television network. The instant invention provides a videophone comprising a camera for capturing images associated with a videophone signal, a videophone unit and a set top terminal or cable modem connecting the videophone to a cable television network. Videophone signals created at the call origination site are encoded and transported to a predetermined destination over an existing cable television network. The system uses IP addresses as phone number on the network. Additionally, transport of videophone signals between different cable systems is accomplished via a high-speed long distance data network, such as, for example, a satellite network, that provides communication between the headends of the different cable television systems. The set top terminal may be a conventional subscriber terminal, a cable modem or a subscriber terminal configured to operate as a cable modem. The set top terminal provides the interface between the videophone and the cable television system. More than one videophone may be connected to a single set top terminal. Display of videophone data may be achieved using any conventional display device, including a television set or a personal computer monitor. Accordingly, the videophone system described herein takes advantage of increased bandwidth and lower cost realized by using existing cable television infrastructure and technology.

20 Claims, 9 Drawing Sheets

U.S. PATENT DOCUMENTS

| | | | |
|---|---|---|---|
| 5,761,286 A | 6/1998 | Das et al. .................. 379/127.06 |
| 5,764,756 A | 6/1998 | Onweller ....................... 379/242 |
| 5,808,662 A * | 9/1998 | Kinney et al. ................ 348/14.1 |
| 5,812,778 A * | 9/1998 | Peters et al. ..................... 725/86 |
| 5,903,309 A | 5/1999 | Anderson ............... 348/333.02 |
| 5,910,815 A | 6/1999 | Boursier et al. ........... 348/14.01 |
| 5,930,451 A | 7/1999 | Ejiri ................................ 386/98 |
| 5,966,164 A | 10/1999 | Gotoh et al. .............. 348/14.01 |
| 5,982,424 A | 11/1999 | Simerly |
| 5,999,207 A | 12/1999 | Rodriguez et al. .............. 348/14 |
| 6,011,782 A * | 1/2000 | DeSimone et al. ........... 370/260 |
| 6,011,909 A | 1/2000 | Newlin et al. ................. 709/227 |
| 6,014,545 A | 1/2000 | Wu et al. ....................... 725/118 |
| 6,069,919 A | 5/2000 | Kwon et al. ............. 375/240.12 |
| 6,111,882 A | 8/2000 | Yamamoto ................... 370/399 |
| 6,119,161 A * | 9/2000 | Lita et al. ..................... 709/227 |
| 6,134,223 A * | 10/2000 | Burke et al. ................. 370/265 |
| 6,141,652 A | 10/2000 | Reeder ........................... 705/53 |
| 6,177,931 B1 * | 1/2001 | Alexander et al. .............. 725/52 |
| 6,256,321 B1 | 7/2001 | Kobayashi .................... 370/464 |
| 6,259,471 B1 * | 7/2001 | Peters et al. ............... 348/14.12 |
| 6,288,742 B1 | 9/2001 | Ansari et al. ............. 348/211.14 |
| 6,317,884 B1 | 11/2001 | Eames et al. .................. 709/217 |
| 6,493,874 B2 | 12/2002 | Humpleman ................... 725/78 |
| 6,546,005 B1 | 4/2003 | Berkley et al. ................ 370/353 |
| 6,587,480 B1 | 7/2003 | Higgins et al. ................ 370/522 |
| 6,614,783 B1 * | 9/2003 | Sonesh et al. ................ 370/352 |

OTHER PUBLICATIONS

U.S. Official Action mailed Jun. 15, 2005 in U.S. Appl. No. 09/481,155.

U.S. Official Action mailed Jan. 31, 2006 in U.S. Appl. No. 09/481,155.

U.S. Official Action mailed Sep. 6, 2006 in U.S. Appl. No. 09/481,155.

* cited by examiner

VIDEOPHONE OVER CABLE NETWORKS

RELATED INFORMATION

The present application is a continuation of U.S. patent application Ser. No. 09/481,155, Rodriguez et al., entitled "Videophone over Cable Networks," filed Jan. 12, 2000 now abandoned, which is a continuation of U.S. patent application Ser. No. 08/857,595, Rodriguez et al., filed May 16, 1997 now abandoned.

FIELD OF THE INVENTION

The present invention relates generally to a video telephone system. In particular, the instant invention is directed to a video telephone system implemented over a cable network, such as, for example, an existing cable television (CATV) network.

BACKGROUND OF THE INVENTION

Recent advances in telephony have made possible full duplex audio communication in conjunction with full duplex video communication. However, many disadvantages are present when implementing video telephony over existing telephone lines. Chief among the problems is that of unacceptable image quality. The images do not have the requisite clarity and sharpness to which consumers have become accustomed. Additionally, motion of the video frames is frequently jittery and synchronism between the motion of the video and the corresponding audio is lost.

There are several high and medium speed transmission technologies currently in use that are capable of carrying acceptable quality digital video telephone (hereinafter referred to as "videophone") signals. Examples of these transmission media include local area networks (LAN) or wide area networks (WAN), which have been used for video conferencing and the like. However, few consumers have access to such networks except via modems that are too slow to accommodate videophone signals in an acceptable manner, i.e., without delays and jitter, thereby failing to alleviate the problems with conventional videophone over existing telephone networks. Additional means for connecting consumers and businesses alike to videophone technology are becoming increasingly available. Among these new technologies are various forms of digital subscriber lines (XDSL), ISDN, and subscriber networks known as switched digital video or fiber-to-the-curb (FTTC).

Many of the above methods for providing videophone services to consumers and businesses suffers from the disadvantage that a new infrastructure must be built at great, almost prohibitive, cost. Furthermore, none of the above-mentioned alternatives has the ability to carry existing analog television signals. In order to overcome these and numerous other disadvantages in the transport of videophone signals, what is needed is a system that is capable of utilizing existing infrastructure, while providing the speed and bandwidth capacity required to realize acceptable videophone signals, thereby avoiding the expense of new infrastructure and providing greater access to videophone services.

SUMMARY OF THE INVENTION

The present invention is directed to a videophone system and method for transporting videophone signals over an existing cable network that overcomes the disadvantages and deficiencies of known videophone systems. In particular, the present invention provides a videophone system that uses existing cable television networks to transport videophone signals to subscribers of the cable television system in an efficient and inexpensive manner. Modern digital cable television (CATV) transmission technology offers many advantages over conventional videophone and video conferencing technology. For example, much of the existing infrastructure of conventional CATV systems may be reused for videophone. Additionally, CATV provides for the carriage of existing analog television signals. Services, such as analog television, can thus share in the cost of the infrastructure and assist in providing a practical and economical means for transporting videophone traffic among consumers, i.e., subscribers of the CATV system, and between consumers and businesses.

The tree-and-branch topology of CATV distribution systems provides unique advantages for downstream (from a headend to a subscriber) broadcast or multicast. The funneling of the tree-and-branch topology in the upstream (from a subscriber to a headend or application server) direction helps to aggregate respondents in a multicast connection. CATV systems also tend to be designed with asymmetrical bandwidth. In other words, there is a very large information carrying capacity in the downstream direction, with lower, but quite adequate, capacity in the upstream direction. The downstream capacity is high enough that digital television quality video and high fidelity multichannel and/or multi language audio can be sent in the downstream direction. This combination of features is ideal for many applications, including videophone and video conferencing. For example, in distance learning, students can tune into a high quality multicast class, while the teacher can view a mosaic composite of the remotely attending students and respond to questions in nearly real time. Businesses can display and sell products and services with high quality video and audio, while seeing reduced quality video images of their customers, thereby providing more personalized, albeit remote, service. Tolls may be paid by the businesses, such as, for example, advertising and sales applications, or even by consumers for services analogous to those that now charge by means of 900 numbers, for example.

The CATV system provides connection to consumers and businesses alike. Existing long distance high-speed networks, including telephone and high-speed satellite television networks, can provide transport of videophone signals between different CATV systems, thereby providing a link between users of different systems. These same long distance networks can provide videophone connects to remote servers as well. Because of the numerous advantages associated with CATV systems, the preferred embodiment of the instant invention described herein uses CATV to transport the videophone signals. However, it will be understood that the invention described herein is not limited to CATV systems. For example, Asynchronous Transfer Mode (ATM) networks may also be used.

According to a preferred embodiment of the present invention, videophone signals are transported over a CATV network to users of the CATV system. The users, or remote ends, of the CATV system are equipped with a videophone, a set top terminal (STT), a monitor (e.g., a television set), a microphone to capture speech, i.e., audio, data, and optionally, a suitable camera for capturing video data for transmission to another user. Videophone signals are generated at the originating STT and are modulated to be transmitted via the cable network through the receiving STT. The receiving STT must have the ability to parse and extract videophone and related data from the data stream.

It is important for videophone signals for a given system to be compatible with the process and capabilities of the various STTs. In a preferred embodiment, the STTs are all digital and are provided with the appropriate hardware and software to be able to process encoded, compressed digital data, such as, for example, MPEG-2 data. At the STT, videophone signals are processed, as required, for the receiver at the remote end. If an STT does not have the required compatibility with a given data standard, some form of data conversion may be required. Typically, this data format conversion would take place at a headend of the CATV system by an application server or other dedicated hardware, given the greater processing power resident at the headend. It will be understood that STTs may also be used to perform the appropriate conversions but, as a practical matter, processing power limitations of the STTs make the headend a more suitable means for signal conversion. If the originating STT is compatible with the receiving STT, no conversion is necessary. Handshaking between the originating and receiving STTs enable the STTs to know the videophone signal format being used. Accordingly, if the originating STTs videophone signals are compatible with the receiving STT, the receiving STT can initiate the appropriate procedures and methods for decoding or processing the incoming videophone signals. If, on the other hand, the originating STT determines that an incompatible format is being used, it can either convert the signals itself, if it has the requisite processing capability, or preferably, the conversion may take place at the headend. The headend will convert and retransmit the converted videophone signals to the appropriate receiving STT. For example, compressed or encoded videophone signals may be converted at the headend by hardware or through high speed computational methods and routed externally to the cable network. The conversion routines have the ability to convert various formats. For example, the conversions may take place from a data specification that was originally intended for either non-guaranteed quality of service or guaranteed quality of service (H.323 and H.322, respectively), to another specification, such as, for example, V.34 (modem), H.324, ISDN (H.320), through a copper wire telephone network or a wireless data specification.

Videophone signals are originated at a given STT. The STT will encode or compress the videophone signals in accordance with the specification thereof. Typically, the audio, or preferred speech signal, and the video, or picture, signal are multiplexed into a given data stream. The specification of the stream adheres to the network with a guaranteed quality of service, or alternatively, a network with a non-guaranteed quality of service. The videophone signals, thus created, are then transmitted via the cable network to their destination, either directly, or via a headend.

In addition to an STT, a user must be equipped with a videophone box or unit (VP). The VP may be separate from the STT, or may be integrated as a card within the STT. The VP receives videophone data intended for a given user from the receiving STT, and transmits the signals to a display device, such as, for example, a television set. The STT may actually perform the parsing of the signals and extraction of data therefrom. The VP is connected with the STT using any of the wide variety of interfaces, including but not limited to, an Ethernet port, Firewire, universal serial bus (USB), and wireless Ethernet, all of which are well known to those skilled in the art. Depending on the network bandwidth and picture quality requirements, Firewire and USB may be particularly well suited for a high-speed serial digital data specification. Wireless Ethernet provides the ability for the STT to communicate videophone data to various televisions that are not equipped with STTs within a given range. Alternatively, the VP will be an add-on module or card that would fit inside an STT thereby providing videophone functionality that is transparent to the user. The interface would typically be PCMCIA or PCI.

Having the VP as part of the STT provides significant operational and cost advantages. For example, the VP card would use the memory and processor capacity of the STT, thereby sharing resources, and proving efficiency and lowering costs. For example, in the stand-alone VP embodiment described earlier, the VP must derive its own NTSC signal and therefore must have the ability to capture the signal. On the other hand, the SIT must, by definition, include data capture capability. Therefore, in the case where the VP is integrated with the STT, the VP would not have to have display capability because it is shared with the STT. As an alternative to STTs, cable modems may be used to link the VP with a given network or display device. Moreover, an STT may be configured to evaluate, or act as, a cable modem for transmission and reception of videophone signals where the VP provides its own display capabilities.

Accordingly, it is an object of the present invention to provide an efficient and cost effective videophone transport system that overcomes the disadvantages of the prior art and provides high-quality visual video signals from proved videophone functionality.

It is another object of the present invention to utilize existing infrastructure to provide videophone connectivity to users.

Yet another object of the present invention is to provide an improved videophone transport system.

It is still another object of the present invention to provide signal conversion capability to allow numerous videophone signaling specifications to exist on a given system or between different CATV systems.

Another object of the present invention is to provide a videophone system wherein a headend may communicate videophone signals originated on an STT thereof, to another cable remotely located CATV system via a high-speed transmission medium, wherein conversion between different videophone signaling specifications is provided to ensure functionality between the various remotely located CATV systems.

These and other objects and their attendant advantages are provided by the videophone system described herein, including a cable television system headend; a plurality of subscriber terminals connected to the headend; a videophone unit connected to at least one of the subscriber terminals; a camera associated with each videophone unit, said camera being adapted to capture images for transmission by the videophone unit; a microphone associated with each videophone unit adapted to capture speech signals; and at least one display device associated with each videophone unit wherein the videophone is adapted to transmit and receive videophone signals over the cable television network.

BRIEF DESCRIPTION OF THE DRAWINGS

The invention will be described in detail herein with reference to the following drawings, in which like reference numerals refer to like elements, and wherein.

DETAILED DESCRIPTION

Figure 1:
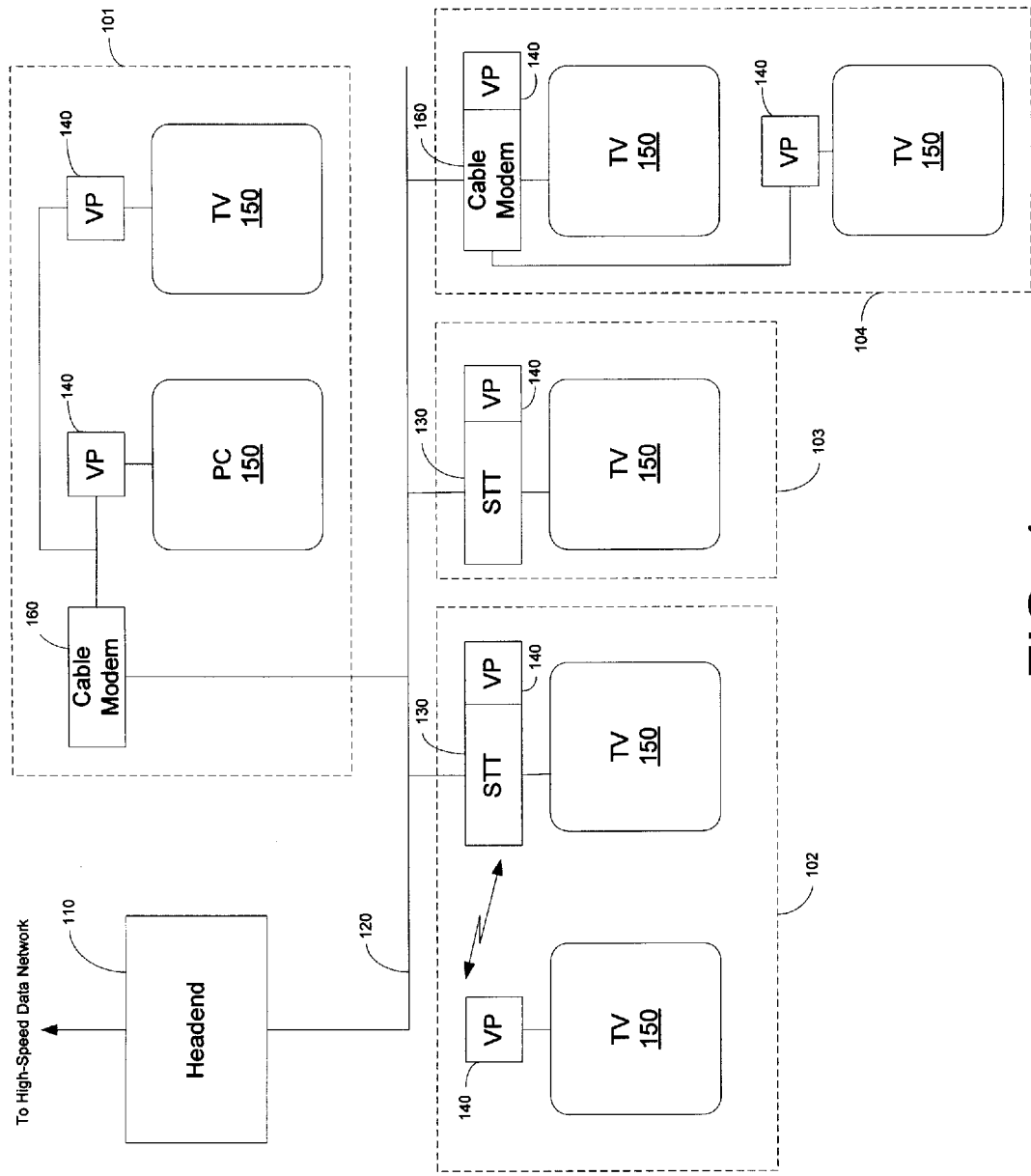
FIG. 1 is a block diagram of a preferred embodiment of the present invention showing various videophone connections to a cable network.

Referring now to FIG. 1, a general block diagram of a CATV system 100 having several uses 101, 102, 103, 104 equipped with videophone capabilities is shown. The headend 110 is connected to the users 101, 102, 103, 104 via a cable 120, which may include various media, such as, for example, fiber optic, copper, or hybrid-fiber-coax (HFC). The headend 110 may also be connected to another CATV network 100' via a high-speed transmission medium 38, such as, for example a satellite network, a high-speed telephone network, or the like. Various videophone configurations are shown in FIG. 1. In a standard videophone configuration, such as that of user 103, data is received by an STT 130 and communicated to a VP 140 co-located with the STT 130. The VP 140 processes the data and provides it either directly to a display device 150, such as, for example, a television set, or provides it to STT 130 for further processing and display by the display device 150. In an alternative configuration 101, the VP 140 may be connected to the cable 120 via a cable modem 160. The display device may be a personal computer 150, television set 150, or the like. As shown in FIG. 1, the STT 130 or cable modem 160 may provide signals to one or more VPs 140 and their corresponding display devices. For example, in a home with multiple televisions 102, 104, or with a PC having video capability 101, a VP 140 may be provided with each display device. It is also possible for wireless communications between an STT 130 or a cable modem 160 and a remote VP 140 as shown in configuration 102. Preferably, the wireless connection is accomplished using wireless Ethernet, or the like. Any number of VPs 140 may be connected to a given STT 130 or cable modem 160. Moreover, an STT 130 may be configured to act as a cable modem 160 for the purposes of achieving videophone functionality, and other services, such as, for example, Internet access. Whereas a cable modem provides services to a computer, a PC, and the like, an STT provides passive and interactive services for a television set in concert with the same services of a cable modem, but receivable through a television set, or to be routed from an STT to a home PC via a wireless or wired Ethernet connection.

Figure 2:
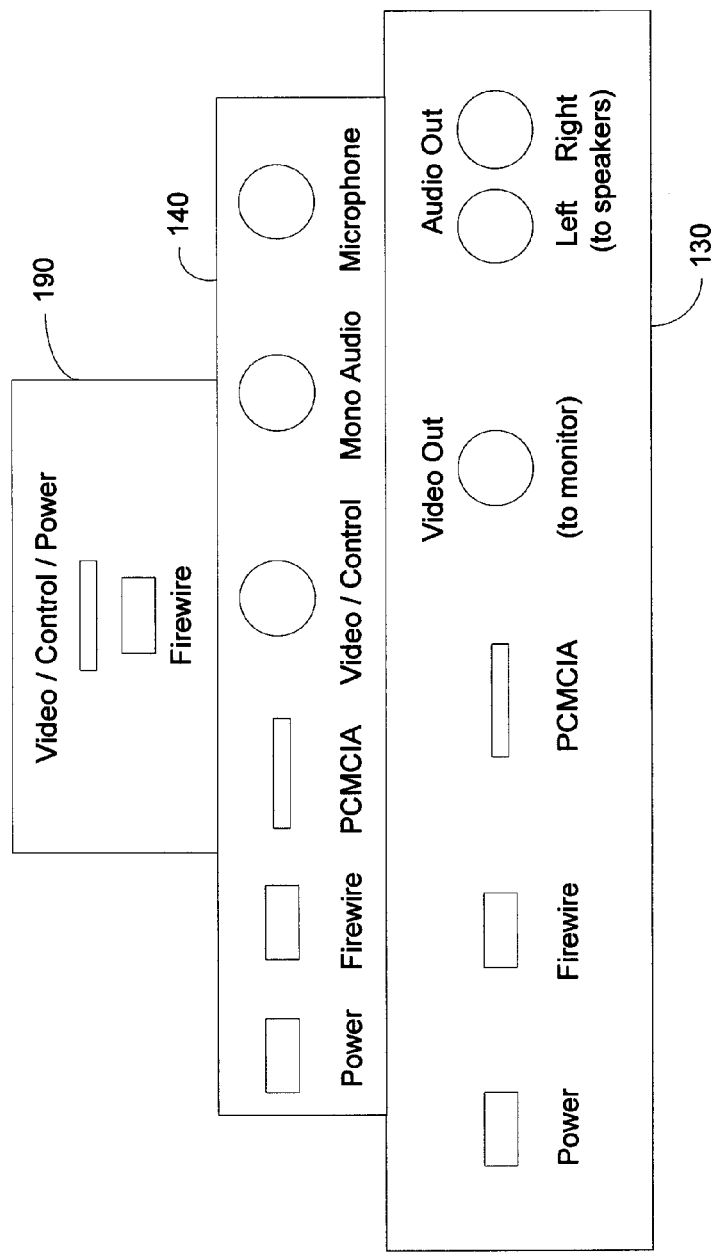
FIG. 2 is a schematic illustration of the functional components of a videophone system required to originate videophone signals.

Referring briefly to FIG. 2, the basic components required at an originating videophone to signal location are shown. It will be understood that the videophone unit and camera shown in FIG. 2 may be included in a single integrated and self-contained device, however, for ease of explanation, they will be described as separate components. A camera 190, such as that described in commonly assigned, U.S. Pat. No. 5,982,424, entitled "Digital Camera for Video Conferencing," to Simerly et al., the disclosure of which is incorporated by reference herein in its entirety, for capturing image data of the call originator is connected by known interface means to a videophone unit 140. The videophone unit 140 is integrated with an STT 130 as discussed herein. The camera 190, videophone unit 140, and STT 130 combine to produce videophone signals for transport via the CATV network (not shown).

Figure 3:
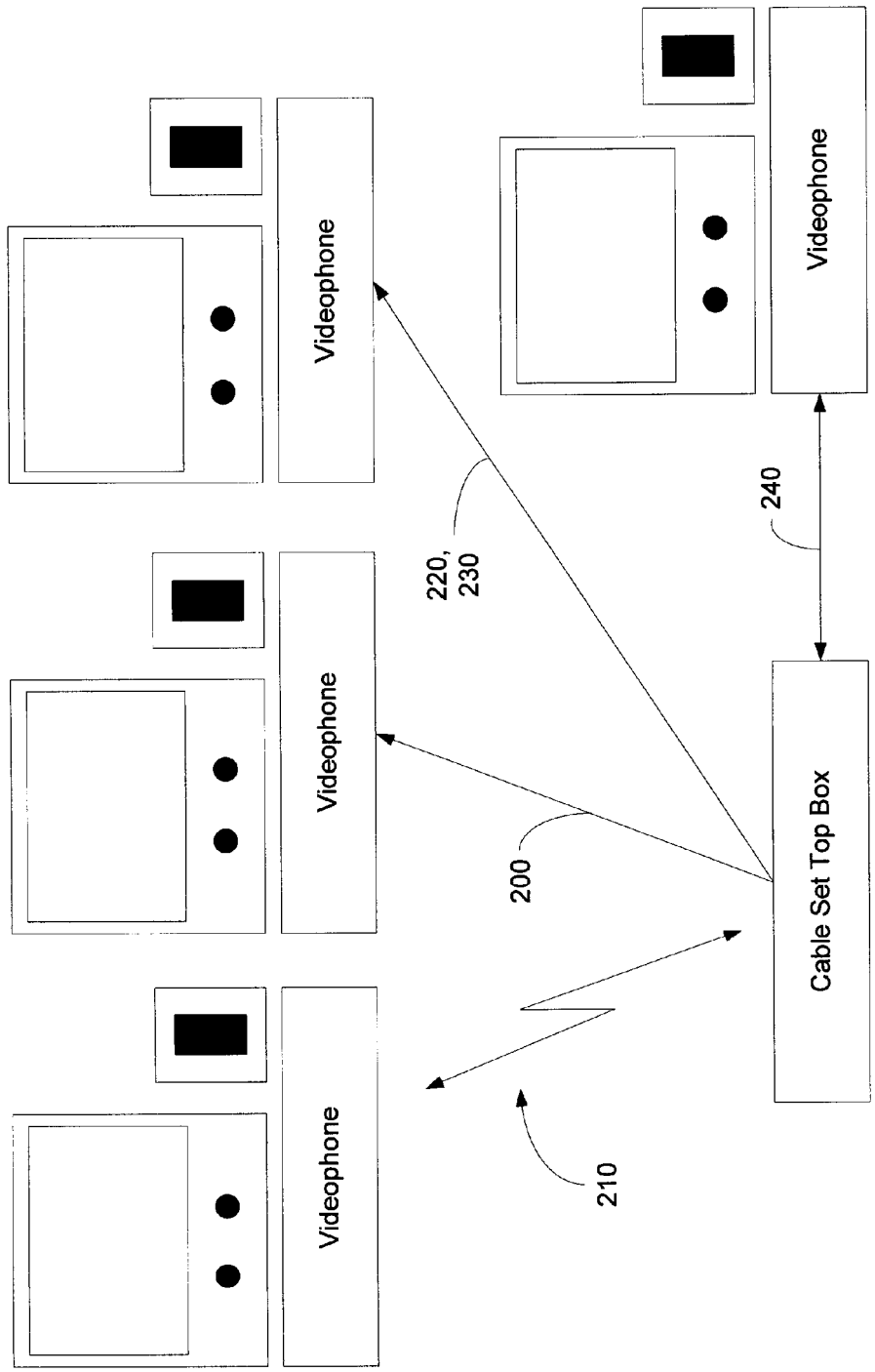
FIG. 3 is a schematic block diagram illustrating different interfaces between the videophone unit and set top box of a preferred embodiment of the present invention.

Turning now to FIG. 3, various means of interfacing a VP 140 to an STT 130 are shown. It will be understood that when referring to an STT, the description is equally well-suited to a cable modem, but STT is being used for convenience and ease of description. The STT 130 may be integrated with a VP 140 by any number of conventional serial interfaces. For example, as shown in FIG. 3, the STT 130 may be connected to the VP 140 by conventional Ethernet 200, wireless Ethernet 210, Firewire 220, and/or USB 230. Firewire 220 and USB are particularly well-suited for high-speed asynchronous serial data transmissions. Wireless Ethernet is particularly advantageous in applications where multiple televisions 150 or display devices are to be connected to one STT 130. Additionally, when retrofitting an existing STT 130 with a VP 140, a PCMCIA cardbus interface 240 may be preferable.

Figure 4:
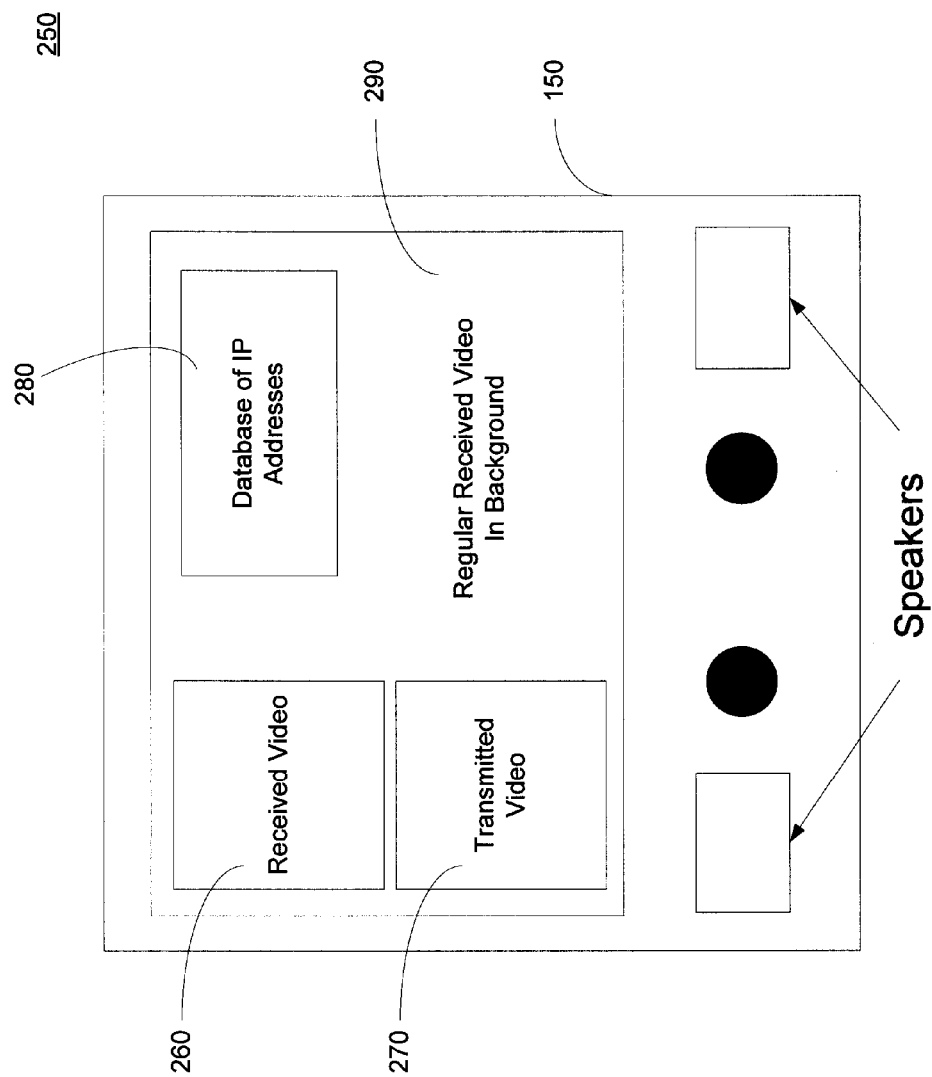
FIG. 4 illustrates a graphical user interface (GUI) for use with the videophone of the present invention.

When placing the receiving videophone calls, it is important to have a functional, flexible and easy to use user interface. Such interface is described in commonly assigned, U.S. Pat. No. 5,999,207, entitled "Method and Apparatus for Implementing a User Interface for a Videophone in a Cable Television Network," to Rodriguez et al., the disclosure of which is incorporated by reference herein in its entirety. The user interface described and shown in FIG. 4, is a graphical user interface (GUI) 250 that is implemented on a display device 150, which may be, for example, a television set, personal computer, or the like. The interface 250 maps various user screens including screens for received video 260, transmitted video 270, a data base listing of IP addresses 280, and the like, and the regular received video in the background 290. The interface 250 is operable via a remote control that may be configured to operate the videophone. The GUI is described in detail in U.S. Pat. No. 5,999,207 and will not be described further herein.

Figure 5:
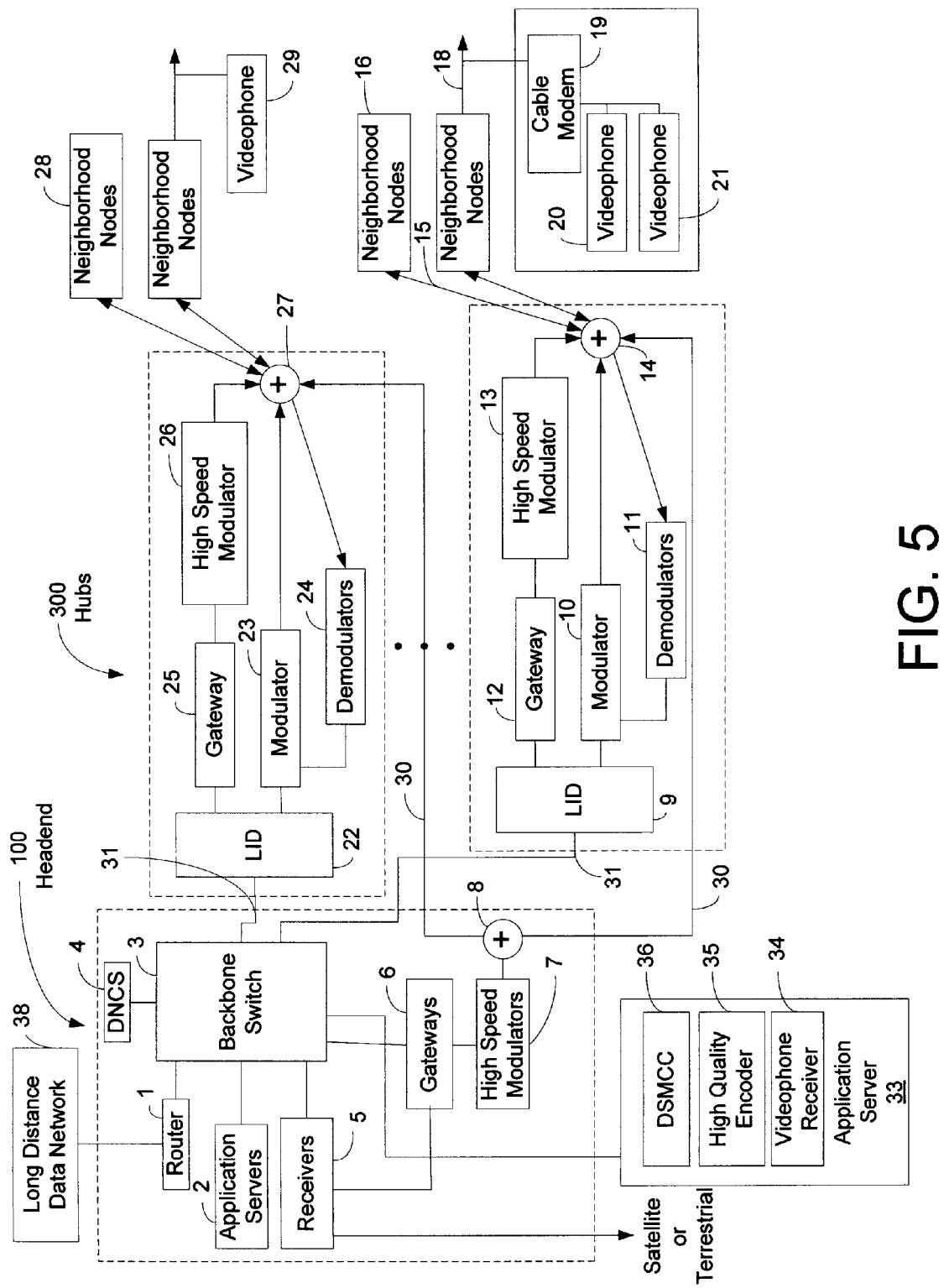
FIG. 5 is a detailed block diagram of a preferred embodiment of the videophone network for the present invention.

Turning now to FIG. 5, a detailed block diagram of the videophone system according to a preferred embodiment of the present invention is shown. The headend 100 houses application servers 2 that may be the source of services as well as means for receiving services from service originators and distributors over satellite or terrestrial transport, via routers 1 and/or receivers 5. High-speed data intended for customers may originate within a general category of local application server 2, with the headend or remotely connected to application server 33 through local or long distance, high-speed data connections 32, 37, respectively. The servers 2 may be digital storage devices with videophone answering machine capabilities, or containing encoded movies, games, shopping services, libraries, data bases, and the like. Furthermore, servers may function to provide data format conversion between different syntax of digital videophone streams, such as, for example, conversion between different videophone standards as discussed above. The server 33 could, for example, include real-time, high-quality video and audio encoders 35, videophone receivers 34, and signaling and control computers 36 for distance learning or commercial applications. Delivered services would include these same types and other services, but delivered by other means such as, for example, satellite or connection to an Internet service provider (ISP).

The servers 2, 33, router 1, receivers 5, control/billing systems and data connections interface to a backbone switch 3. The switch 3 may connect the desired service with the transmission path carrying the data to the consumer desiring it on an interactive on-demand, near-on-demand, or broadcast basis. In small systems, the switch 3 may be omitted, at the cost of reduced flexibility. Gateway 6 between the switch and the modulator 7 provides protocol translation and demultiplexing as appropriate for transport. Modulators 7 translate bits to changes in amplitude or phase or a radio frequency (RF) carrier that may be combined and inserted into the distribution plant.

Signals may also be carried to and from consumers directly from the headend 100 to the distribution plant using HFC technology. In larger systems, some of the functions of the headend 100 could be remotely carried out by one or more hubs 300 as shown in FIG. 5. Optical supertrunks 30, well-known in the CATV industry, may be used to carry modulated analog and digital signals to various hubs 300. Transport of baseband digital signals 31 between the headend 100 and hubs 300 may use a number of LAN or WAN technologies, including, but not limited to, ATM dedicated lines or SONET. The LAN interface device (LID) 9 may be, for example, a router or edge switch, depending on the LAN or WAN architecture used. The medium for both modulated signals and baseband digital signals is, preferably, single mode optical fiber. It will, however, be understood that any acceptable transmission medium known to those skilled in the art may be used.

From the hubs, HFC may be used to deliver the signal to and from customers. HFC typically uses frequency division multiplexing (FDM) of carriers modulated with analog or digital information used to combine analog and digital services on the common optical or coaxial media used for transport within the CATV system. HFC architecture uses optical media 15 to carry the signal to a neighborhood node 16. Separate optical media 15 may be used for downstream and upstream traffic, or the same media may be shared using wavelength division multiplexing (WDM), as is economically preferable given current technology. From the node coaxial cable, various RF devices are used to deliver signals within the neighborhoods. The coaxial transport path 18 is typically bidirectional and may carry downstream and upstream traffic on the same media using FDM to keep the traffic separate. Videophone 21 may be a stand-alone device which is connected to the CATV system through a separate cable modem 19 in the same way that a personal computer (PC) would use a cable modem to connect it to the system for applications such as Internet access. When the videophone 21 and the cable modem 19 functionality is separated, and it is possible to connect multiple videophones 21 to one cable modem 19 through a shared or switched media hub 20 or other LAN technology. This will be useful for schools, businesses, or the like, in particular. The videophones 21 could communicate locally through the LAN, for example, without using the network, or could communicate through the network to remote videophones 29.

The cable modem 19 may be a dedicated modem device, or may be a modem application running on a digital STT that could also support other two-way multimedia services. In this case, the cable modem functionality would be an application that could be resident on the STT, or could be downloaded from an application server 2 on the system. Cable modem functionality could include the ability to decode high-quality downstream video and audio using multimedia processes resident in the STT, while differently encoding lower quality video and audio intended for upstream transmission.

The videophone functionality may optionally be integrated into the STT 29, or use some internal STT resources and some supplementary device connected to the STT through a port, such as, for example, PCMCIA or other means as described herein.

A digital network control system (DNCS) 4 at the headend or some remote network operation center connects the system and performs management, control, configuration and connection services for elements within the system.

There are myriad options for transporting videophone traffic within CATV systems. The preferred method for implementation will be described herein and known applicable standards will be referenced. It will be understood that these standards are well known to those skilled in the art and to the extent necessary, they are incorporated by reference herein.

The backbone switch 3 and all directly connected elements 1, 2, 3, 4, 5, 6, 9, 33 for a backband digital communication system that uses LAN and WAN technologies for the transport, address resolution and encapsulation. This technology is changing rapidly as the demand for high-speed data increases and with the popularity of the Internet, the speed of end systems and the demands of new applications. Videophones, interactive multimedia and games make larger demands of system bandwidths than have been experienced to date. Thus, options for media, media access control (MAC), and higher level protocols are changing rapidly. Accordingly, what is described herein in detail is the current selection of technologies and protocol for videophone transport and the associated existing standards. It will be understood, however, that these technologies and protocols are subject to change, but the fundamental data communication transport will remain the same.

The system described herein uses asynchronous transfer mode (ATM) as described by the ATM forum. ATM cells are carried on an OC3c frame and rate. Address resolution is accomplished with permanent virtual circuits (PVCs) that are set up with Internet protocol (IP) routes between the ATM elements of the system 1, 2, 3, 4, 5, 6, 9, 33. IP encapsulation in ATM cells uses RFC-1483 LLC/SNAP. Among the alternatives to PVCs for address resolution and encapsulation are the ATM forum standards for LAN emulation over ATM (LANE) or multiprotocol over ATM (MPOA). MPOA may be more appropriate than PVCs and IP routes, but currently, the standard has not been completed. Thus, the PVC/RFC-1483 implementation is an operable and intermediate solution. For this implementation, a router may be used as the LID.

When IP is used as a network layer in the protocol stack, there are several choices for what to use in the transport layer. TCP is unsuitable because it retransmits unacknowledged data. UDP is more suitable because it is simple and generally supported. Other transport layer protocols, such as, for example, resource reservation protocol (RSVP) and real-time transport protocol (RTP) may be used.

Some downstream high-quality video and audio may be encoded using standards such as MPEG Dolby AC-3®. Thus encoded data would not use IP, although IP data may be carried with it. The video and audio data would be transported using MPEG-2 transport packets. For transport over ATM 32 PVCs, the packets would be segmented using AAL-5 as specified in DAVIC 1.1. MPEG standard digital storage media command and control (DSMCC) protocol may be used between the subscriber videophone, the DNCS 4 and the computer 36 within application server 33 to set up an interactive session with the subscriber, or to allow the subscriber to join a broadcast or multicast, such as by connection to a continuous feed session (CFS). The DSMCC protocol provides the information needed to locate the downstream broadcast or multicast.

It is noted that the described method for delivering high-quality video and audio downstream to the consumer, while transmitting back reduced quality, uses mechanisms independent of videophone protocols. The method uses technology and protocols not intended for videophone but intended for interactive cable television applications. The method also allows the exploitation of resources in cable television STTs that will be more affordable by the sales volumes associated with the intended applications. Thus, the customer will benefit from dual use of the equipment and resulting cost savings.

Downstream high-speed traffic, including videophone, uses gateway 6, 12 and high-speed modulator 7, 13. The gateways 6, 12 perform the protocol translation and demultiplexing required to interface high-speed data to HFC networks. The input of the gateways may be either IP or MPEG transport packets over ATM. Although ATM is a viable protocol for transport over HFC, the system described herein terminates ATM at the gateway 6, 12 and uses MPEG-2 transport over the HFC network because of its efficiency and its advantages in transport of time critical data such as, for example, live video and audio. Thus, the gateways reassemble the contents of ATM cells and encapsulate the contents into MPEG transport packets, translate ATM connection identifiers into packet identifiers (PIDs), add service identification information, and encrypt and demultiplex data into appropriate modulators 7, 13 under control of the DNCS 4. Modulators 7, 13 comply with DAVIC 1.1 and typically use 64 or 256 quadrature amplitude modulation (QAM) as DAVIC 1.1 specifies. It will be understood, however, that NQAM and other spectrum efficient modulation is possible. Interleaving, forward error correction (FEC), constellation bit encoding, and randomization are as specified in DAVIC 1.1. Alternatives include DBV and ITU-B. Future standards may include IEEE 802.14 and multimedia communications network systems (MNCS).

Signaling and control traffic uses demodulators 11, 24 and modulators 10, 23 that comply with DAVIC 1.1. The demodulators 11, 24 also receive the upstream traffic from applications that use the high-speed modulators and gateways. Though the modulators 10, 23 are primarily intended for signaling and control, due to limited bandwidth, low data rate applications can also use the modulators 10, 23 for downstream IP transmissions in lieu of the gateways 6, 12 and high-speed modulators 7, 13. Modulation is typically quadrature phase-shift keying (QPSK), although other methods are possible. Interleaving, FEC, constellation bit encoding, and randomization are specified in DAVIC 1.1. Future standards may also include IEEE 802.14 and MNCS.

IEEE 802.14 is one of several coming standards for data transmission, specifically for cable modems on HFC systems. However, there are no currently completed standards for cable modems. Accordingly, the system described will use a DAVIC 1.1 compliant multimedia STT 19 running a cable modem application for the originating end. The videophone with which it communicates 29 will be an integrated STT with videophone.

As described above, it is possible to have more than one videophone within a home, school or place of business. In this case, a small LAN can be connected to the cable modem and the videophones can be connected to the LAN. Ethernet may be used as a means of connecting the videophones and the cable modem on the LAN. There are other options such as token rings that are well known to those knowledgeable in LAN technology. Other means for connecting a single videophone to an STT, such as, for example, USB, parallel interfaces and others are possible. These do not require an IP address for both the videophone and the STT, as would be the case for an STT with integrated or add-on video functionality 29.

The initialization and connection process of the system described above will be discussed herein. As described above, PVCs are set up between the ATM elements of the system 1, 2, 3, 4, 5, 6, 9, 33. IP packets find their way to their destination using IP routes through the PVCs. MPEG packets also use PVCs over ATM for connection to gateways 6, 12, 25. The PVCs may be predetermined and entered into the devices manually, or they may be controlled in the devices by the DNCS 4. The DNCS 4 may dynamically create and tear down the PVCs, or may do this semi-permanently under control of an operator or script. Initially, the system described herein, is accomplished using the DNCS 4 semi-permanently when the system is first set up. Bandwidth in specific gateways and high-speed modulators 25, 26, 12, 13 is reserved for use by videophone applications. IP network addresses for videophone applications are selected to be different from the network addresses assigned to the STTs, modulators and demodulators 10, 11 for the control and signaling purposes. Application servers, routers and gateways used in videophones are given IP addresses within the videophone network addresses. PVCs are set up between the elements supporting videophone. IP routes are set up in system routers 1, 9, 22, directing traffic with videophone IP addresses to the correct PVCs.

When a DAVIC 1.1 compliant STT 19 is connected to a system it first communicates with the demodulator 11 and modulator 10 to establish a DAVIC 1.1 media access control (MAC) connection. Once the connection occurs, the STT may request a system connection from the DNCS 4 using the DSMCC protocol. A user may, through the STT, access a number of applications including conventional CATV services as well as digital services. In the videophone case, the users may, through a menu, access a videophone application. The software for the videophone application may be resident in the STT, it may be downloaded through a requested interactive connection with an application server 2, or it may be broadcast by application server 2. In the broadcast case, the STT need only learn from the system where it can find the desired application. The software may include simple cable modem functionality or may include the ability to use STT resources for requesting, locating, and decoding high-quality video and audio.

In the case where an STT is configured as a simple cable modem for videophone, it is assigned an IP address for its interface to the videophone. In the case of more than one videophone at a location, each videophone is also assigned an IP address within the same network or subnetwork as the cable modem. The IP address for a given videophone is what as used as its "phone number." Calls within the LAN network or subnet, only require the IP address of the destination videophone be entered. The cable modem ignores the traffic not addressed to its videophone and does not transmit it to the system. Calls to IP addresses that are not within the internal LAN's network or subnet, are directed to the cable modem as the default router.

When the cable modem first receives a packet destined for the network, it uses DSMCC signaling to request a videophone section from the DNCS 4. The DNCS will assign a reverse path bandwidth on one of the demodulators 11 and log the assignment for billing purposes. Videophone applications will usually require constant bandwidth assignment. This would typically be done using time division multiple access (TDMA) or non-contention slots as described by DAVIC 1.1.

At this point, bidirectional bandwidth is assigned to the videophone session on videophone 21. The videophone may now insert its data into an IP packet transport through the cable modem 19 to the demodulator 11 and to the LID 9. The LID 9 looks at the IP address and finds a route to an ATM PVC through the switch 3 to a router 1. The router 1 looks at the destination IP address and finds a route to an ATM PVC back through switch 3 or to a similar switch on the other side of the long distance network 38. If the destination IP is on the same system as the videophone 21, the IP packet goes back through the switch 3 to a gateway 6 servicing the destination IP network. From the gateway 6, the IP packet is sent to the associated high-speed modulator and through the supertrunk and HFC network to the destination videophone 29. An alternate path to videophone 29 could be through an LID 22, gateway 25, and modulator 26 in a hub 300.

Upon receipt of an IP packet, the destination videophone, which is already initialized, uses DSMCC to request a session from the DNCS 4. The DNCS 4 then assigns a TDMA return bandwidth, thus allowing the destination videophone 29 to ring the phone and allow response packets to be transmitted. At the end of the call, the application must notify the DNCS 4 through DSMCC signaling in order to terminate the session and end the billing period.

An STT configured for high-quality downstream reception may also be given an IP address for connection to an external videophone as set forth above, or may be connected to the videophone through means other than a LAN connection, such as, for example, PCMCIA or a bus connector.

A videophone connection could be requested using a graphical user interface (GUI) running on the STT itself, manipulated by remote control or other means. Upon request, the STT could use DSMCC signaling to communicate with DNCS 4 and request a connection to a given application server 33 providing a service such as, for example, distance learning. DSMCC allows for interactive connections with a service, in which case the service could be started, paused or scanned on demand. DSMCC also allows for connection to an ongoing service through means such as continuous feed sessions.

The DNCS 4 will assign TDMA reverse bandwidth, as set forth above, and provide the STT with the required information such as, for example, high-speed modulator 7, 13, 26 frequency as well as MPEG program number, so the STT can find the MPEG PID to identify the required bit stream. The DNCS 4 would also provide the source and destination IP addresses needed for upstream videophone transmission. The DNCS 4 would also begin billing upon confirmation of the session connections and would bill the customer and/or the service provider as appropriate for the requested service.

It will be noted that this method for delivering high-quality video and audio downstream to the consumer, while transmitting back reduced quality, using mechanisms independent of videophone protocols. The method uses technologies and protocols not intended for videophone, but intended for interactive cable television applications. This method allows the exploitation of resources in cable television STTs capable of decoding higher bandwidth and higher quality digital video intended for entertainment that will be made affordable by the sales volumes associated with the intended applications. Thus, the consumer will benefit from dual use of equipment and resulting cost savings.

Figure 6:
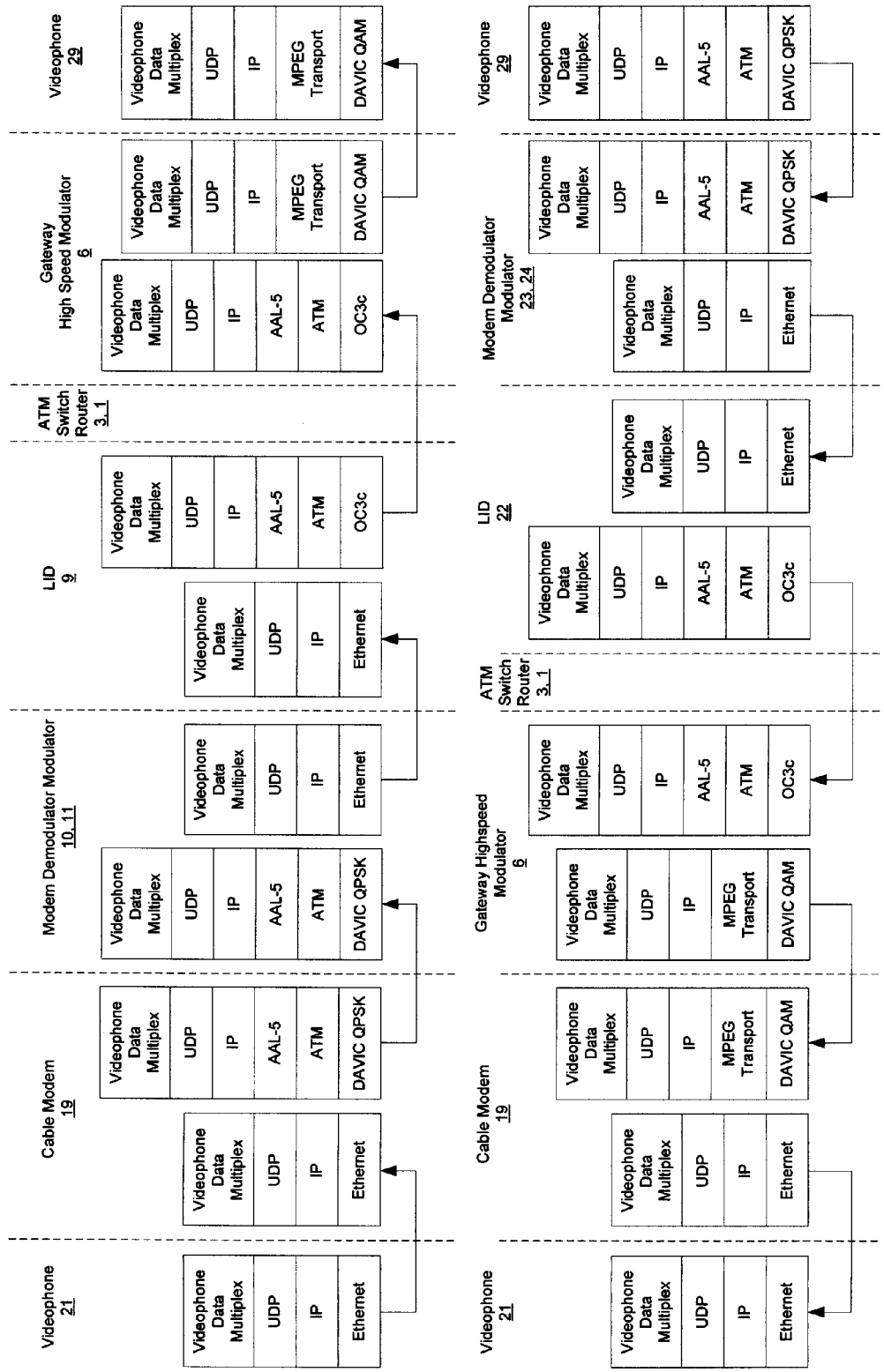
FIG. 6 is a block diagram showing protocol stacks and transport between different videophone in a given CATV system.

FIG. 6 illustrates protocol stacks and data transport between a videophone 21 that uses a simple cable modem 19 with an Ethernet connection between them, and a videophone 29 that has a self-contained modem or is built integral to, or as an attachment to a digital STT. The simplex transmission descriptions will be used for simplicity, but full duplex operation is normally carried out so that the transmission and reception are occurring simultaneously.

The videophone 21 first takes the encoded video and audio and multiplexes in control and messaging. A UDP transport header is added as well as IP addressing. Ethernet or IEEE 802.3 is used to transport the data to the cable modem 19. Signal flow in this sequence is shown as left to right across the top of FIG. 6. The cable modem 19 terminates the Ethernet. The cable modem takes the multiplex along with the UPD and IP layers, and uses RFC-1483 to segment the IP AAL-5 over the ATM. It encodes these into DAVIC QPSK and transmits them to the hub modem (modulator 10, demodulator 11). The modem terminates ATM and transports the IP information over Ethernet to the LID 9. In future implementations, the intermediate Ethernet may be left out and the data may remain over ATM and between the hub modem and LID 9. The LID 9 output again uses RFC-1483 encapsulation of the IP into ATM. The physical layer at the output of the LID 9 is optical fiber with sonnet OC3c framing. The signal remains in this format throughout the backbone ATM switch 3, into, and back out, of the router 1, and again through the backbone ATM switch 3 to the gateway 6. The gateway 6 may pass the signal through in ATM as discussed above. In this implementation, the gateway 6 terminates the ATM and carries the IP packet to the MPEG-2 transport packets. The high-speed modulator adds the DAVIC QAM layer for transmission downstream to videophone 29. The Ethernet connection is omitted because the modem functionality is integral to the videophone. Videophone 29 receives the information and decodes it.

The return from videophone 29 is shown in FIG. 6 at the lower portions from right to left. Videophone 29 encodes and multiplexes video, audio, control and messaging as before, and passes the data to the UDP and IP layers. These packets are segmented into ATM AAL-5 and transmission using DAVIC QPSK. The hub modem (modulator 23, demodulator 24) receives and reassembles the transmission and creates an Ethernet stream for transmission to the LID 22. The LID 22 terminates the Ethernet and again segments the data into ATM AAL-5 for transmission over the OC3c link to the backbone ATM switch 3, in and out of the router 1, back through the switch 3 and to the gateway 6. The gateway 6 terminates ATM and uses MPEG-2 transport packets that are QAM modulated 7 for downstream transmission to the cable modem 19. Once again, Ethernet is used to send the information to the videophone 21.

Figure 7:
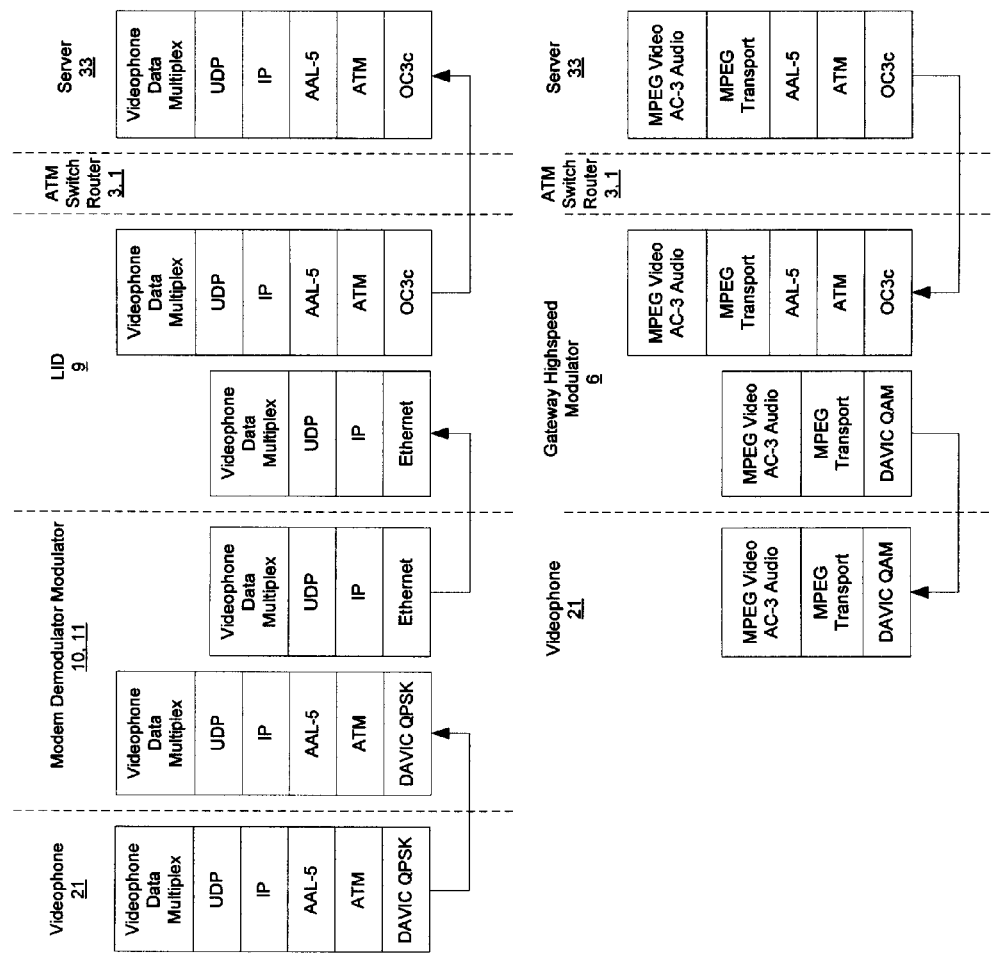
FIG. 7 is a block diagram showing protocol stacks and transport for high-quality downstream transmission of videophone signals according to the present invention.

Referring now to FIG. 7, the protocol stacks and data transport between the videophone 21 that are capable of receiving high-quality video and audio and a server that can encode such video and audio is illustrated. As above, full duplex is possible. The method for delivering high-quality video and audio downstream to the consumer, while transmitting back reduced quality, uses mechanisms independent of the videophone protocols. It uses technologies and protocols not intended for videophone, but intended for interactive cable telephone applications.

The normal quality videophone multiplex is delivered to UDP/IP within the videophone 29. These packets are segmented into ATM AAL-5 and transmitted to the modem (demodulator 24, modulator 23) using DAVIC QPSK. The modem reassembles and terminates ATM, although future implementations may continue ATM through the LID 22 as described above. Current transmission from the modem 23, 24 to LID 22 uses Ethernet or IEEE 802.3. The LID terminates the Ethernet and again segments into AAL-5 ATM for transmission over OC3c, through the backbone ATM switch 3 to the server 33. The server includes the high-quality video and using PEG, Dolby AC-3® or other standards. It is noted that UDP/IP is not used here. The data uses MPEG-2 transport instead of UPD/IP, and uses DSMCC signaling as described above, to send the STT the information required to locate downstream transmission.

The server 33 segments the MPEG transport package into AAL-5 ATM and transmits them through the backbone switch 3 through to the gateway 6 over OC3c. The gateway 6 recognizes MPEG packets instead of IP in the ATM, and reassembles them, terminating the ATM. PIDs are remapped under control of the DNCS 4, if necessary. System information required for the STT to locate the streams is added, and data is DAVIC QAM modulated 7. The STT working with the videophone 29 receives the stream, parses out the desired MPEG transport packet, decodes the video and audio and outputs these for display. Though delays are normally associated with the higher quality video and audio intended for entertainment, these delays are tolerable in applications such as, for example, distance learning.

It is important for video signals for a given system to be compatible with the process and capabilities of the various STTs. In a preferred embodiment, the STTs are all digital and are provided with the appropriate hardware and software to be able to process encoded, compressed digital data, such as, for example, MPEG-2 data. At the STT, videophone signals are processed, as required, for the receiver at the remote end. If an STT does not have the required compatibility with a given data standard, some form of data conversion may be required. Typically, this conversion would take place at a headend of the CATV system, given the greater processing power resident at the headend. It will be understood that STTs may also be used to perform the appropriate conversions but, as a practical matter, processing power limitations of the STTs make the headend a more suitable means for signal conversion. If the originating STT is compatible with the receiving STT, no conversion is necessary. Handshaking between the originating and receiving STTs enable the STTs to know the videophone signal format being used. Accordingly, if the originating STTs videophone signals are compatible with the receiving STT, the receiving STT can initiate the appropriate procedures and methods for decoding or processing the incoming videophone signals. If, on the other hand, the originating STT determines that an incompatible format is being used, it can either convert the signals itself, if it has the requisite processing capability, or preferably, the conversion may take place at the headend. The headend will convert and retransmit the converted videophone signals to the appropriate receiving STT. For example, compressed or encoded videophone signals may be converted at the headend by hardware or through high speed computational methods and routed externally to the cable network. The conversion routines have the ability to convert various formats. For example, the conversions may take place from a data specification that was originally intended for either non-guaranteed quality of service or guaranteed quality of service (H.323 and H.322, respectively), to another specification, such as, for example, V.34 (modem), H.324, ISDN (H.320), through a copper wire telephone network or a wireless data specification.

Videophone signals are originated at a given STT. The STT will encode or compress the videophone signals in accordance with the specification thereof. Typically, the audio, or preferred speech signal, and the video, or picture, signal are multiplexed into a given data stream. The specification of the stream adheres to the network with a guaranteed quality of service, or alternatively, a network with a non-guaranteed quality of service. The videophone signals, thus created, are then transmitted via the cable network to their destination, either directly, or via a headend.

Figure 8:
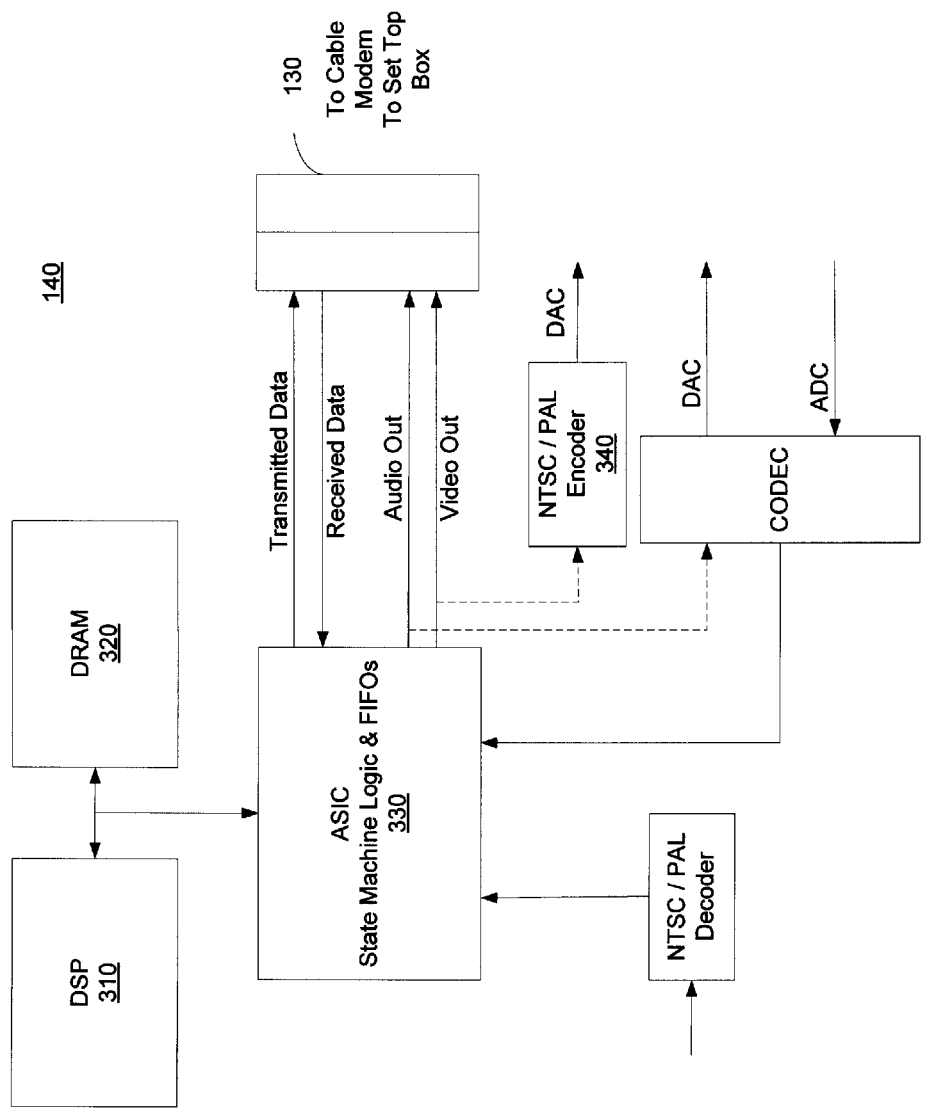
FIG. 8 is a block diagram of the videophone unit according to a preferred embodiment of the present invention.

Referring now to FIG. 8, a general block diagram of the videophone unit 140 is shown. Videophone signals are received via a cable modem or STT 130 and transmitted to an application specific integrated circuit (ASIC) 330 containing various state machines and FIFO buffers. The data thus received is processed by a digital signal processor (DSP) 310, such as, for example, Texas Instruments, TMS 320C80 or 82. The software used by the DSP is contained in a DRAM 320. The information that is decoded is processed via NTSC, PAL and/or SECAM encoder 340 and provides audio video outputs back to the cable modem or STT and to the display device. The state machine controls the traffic of data for full-duplex operation and associated functionality. The state machine further generates timed signals to control digital logic devices and to cache and route data to their respective destination buffers in DRAM 320. Compressed videophone data decoded by the DSP 310 is transferred to encoder 340 for viewing and audio playback. Local pictures and speech signals are digitized by the NTSC/PAL/SECAM decoder as controlled by the state machine 330 and compressed by the DSP 310, buffered into DRAM 320 and then transmitted through the STT 130 to send the compressed signal to its destination through the cable network.

Figure 9:
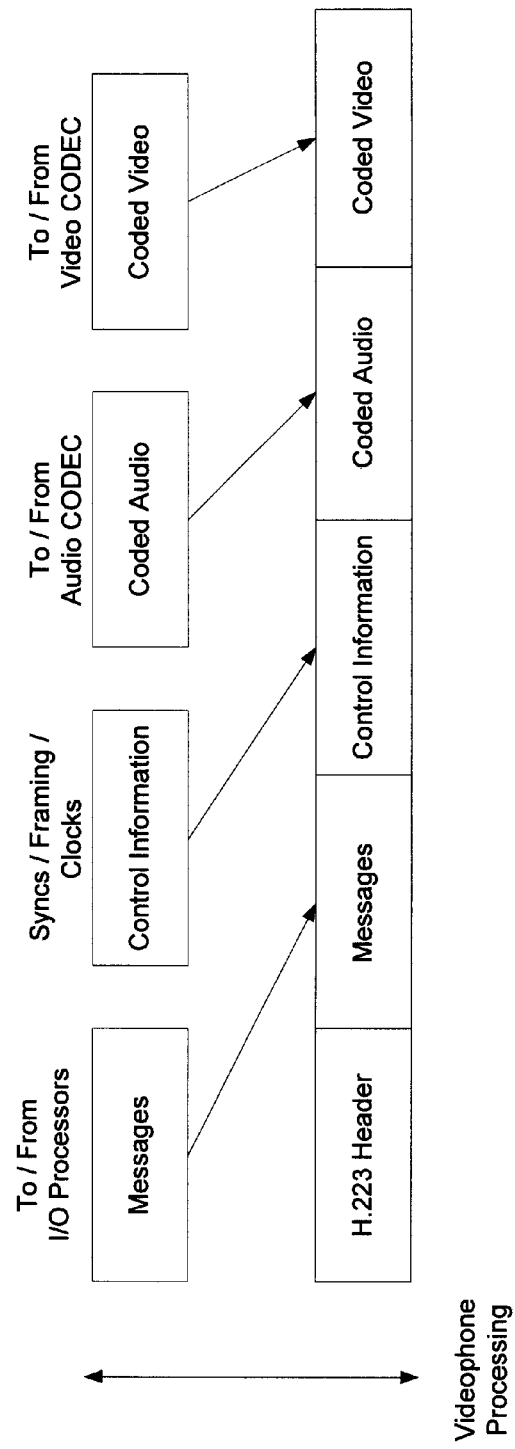
FIG. 9 shows various exemplary videophone data multiplex structures used in the videophone system according to an embodiment of the present invention.

FIG. 9 shows various data structures and data packet structures used in the videophone applications described herein. These data structures represent the videophone data multiplex in FIG. 6.

While this invention has been described in conjunction with the specific embodiments thereof, it is evident that many alternatives, modifications and variations will be apparent to those skilled in the art. Accordingly, the preferred embodiments of the invention, as set forth herein, are intended to be illustrative and not limiting. Various changes may be made without departing from the truth and the full scope of the invention as defined by the following claims.

The invention claimed is:

1. A videophone system for receiving and providing a plurality of signals, the videophone system comprising:
    a cable set top box including videophone functionality integrated as a card for concurrently receiving and processing a broadcasted television signal comprising video and audio signals and a singlecasted videophone signal;
    a display device for displaying the broadcasted television signal in a first portion of a display and for displaying the singlecasted videophone signal on a second portion of the display over the broadcasted television signal; and
    a stand-alone videophone wirelessly connected to the cable set top box, wherein the stand-alone videophone has a different IP address than the cable set top box.

2. The videophone system of claim 1, further comprising a communications system for transmitting the broadcasted television signal and the singlecasted videophone signal, and for receiving a return singlecasted videophone signal from the cable set top box.

3. The videophone system of claim 2, wherein the return singlecasted videophone signal is generated by a camera and a microphone, wherein the camera produces video images and the microphone produces associated audio, wherein the video images and the audio are provided to the cable set top box.

4. The videophone system of claim 3, wherein the video images produced by the camera are displayed in a third portion of the display.

5. The videophone system of claim 3, wherein the video images produced by the camera are displayed in a third portion of the display, and wherein the cable set top box provides a database listing of IP addresses for displaying in a fourth portion of the display.

6. The videophone system of claim 5, wherein the return singlecasted videophone signal further includes an IP address, wherein the IP address is associated with a cable set top box that is intended to receive the return singlecasted videophone signal.

7. The videophone system of claim 1, further comprising at least one remote videophone device that is capable of receiving the singlecasted videophone signal from the cable set top box.

8. The videophone system of claim 7, further comprising a remote display device coupled to the remote videophone device for displaying the singlecasted videophone signal received from the cable set top box.

9. The videophone system of claim 2, further comprising a cable modem for modulating and transmitting the return singlecasted videophone signal comprising a video image, audio, and an IP address associated with a receiving cable set top box.

10. A communications system for transmitting and receiving a plurality of signals, the communications system comprising:
  a plurality of set top boxes each for concurrently receiving from the communications system a broadcasted television signal and a singlecasted videophone signal, wherein the singlecasted videophone signal is received by a set top box based on a set top box IP address, and wherein each set top box transmits a reverse singlecasted videophone signal, wherein at least one of the plurality of set top boxes is a self-contained device comprising an integrated videophone device and a stand-alone videophone wirelessly connected to the set top box, wherein the stand-alone videophone has a different IP address than the cable set top box; and
  a control system for receiving a videophone request from a first set top box to transmit a reverse singlecasted videophone signal to a second set top box, and for assigning reverse path bandwidth on one of a plurality of demodulators between the first and second set top boxes.

11. The communications system of claim 10, further comprising a server for performing data format conversion, if necessary, of the reverse singlecasted videophone signals between the first and second set top boxes.

12. The communications system of claim 10, wherein the second set top box may reside in a network system outside of the communications system, and the server performs data format conversion to a data format associated with the network system.

13. The communications system of claim 10, wherein the at least one of the set top boxes that comprises the integrated videophone device further comprises a camera and a microphone, a second plurality of the each of the set top boxes comprising:
  a camera for producing video images;
  a microphone for producing audio; and
  a videophone device for receiving the singlecasted videophone signal, and for providing the reverse singlecasted videophone signals comprising the video images and audio into a header packet, the header packet further comprising an IP address associated with a receiving set top box.

14. The communications system of claim 13, further comprising a display device coupled to the each of the set top boxes for displaying the broadcasted television signal in a first portion of a display, and for displaying the singlecasted videophone signal on a second portion of the display, the produced video images on a third portion of the display, and a database listing of IP addresses on a fourth portion of the display.

15. The communications system of claim 13, a subset of the each of the set top boxes comprising:
  a cable modem for modulating and transmitting the header packet using a QPSK modem.

16. The communications system of claim 15, the communications system further comprising:
  a switch for receiving the header packet and routing the header packet to the intended receiving set top box associated with the IP address.

17. The communications system of claim 13, further comprising a remote videophone device coupled to at least one of the set top boxes, wherein the set top box provides received singlecasted videophone signals to the remote videophone device for further processing.

18. The communications system of claim 17, further comprising a remote display device coupled to the remote videophone device for displaying the received singlecasted videophone signals.

19. The communications system of claim 18, further comprising:
  a remote camera coupled to the remote videophone device for producing video images; and
  a remote microphone coupled to the remote videophone device for producing audio,
  wherein the remote videophone device provides a reverse singlecasted videophone signal comprising the video images and audio to the set top box for further transmission to the communications system.

20. The communications system of claim 19, wherein the remote display device displays both the received and reverse singlecasted videophone signals.

\* \* \* \* \*